US008081141B2

(12) United States Patent
Thiele et al.

(10) Patent No.: US 8,081,141 B2
(45) Date of Patent: Dec. 20, 2011

(54) AIRBORNE EMITTER/RECEIVER ARRAYS, AND ASSOCIATED SYSTEMS AND METHODS

(75) Inventors: James R. Thiele, Hillsboro, OR (US); Rudolf H. Bartel, Portland, OR (US); Lance L. Nordby, Hillsboro, OR (US)

(73) Assignee: American Blimp Corporation, Hillsboro, OR (US)

( * ) Notice: Subject to any disclaimer, the term of this patent is extended or adjusted under 35 U.S.C. 154(b) by 809 days.

(21) Appl. No.: 11/841,369

(22) Filed: Aug. 20, 2007

(65) Prior Publication Data

US 2008/0047176 A1 Feb. 28, 2008

Related U.S. Application Data

(60) Provisional application No. 60/840,172, filed on Aug. 25, 2006.

(51) Int. Cl.
*G09G 5/00* (2006.01)
*G09G 3/20* (2006.01)
*G09G 3/36* (2006.01)
*G06F 3/033* (2006.01)
*G09F 7/22* (2006.01)
*G06F 1/16* (2006.01)
*H05K 5/00* (2006.01)
*H05K 7/00* (2006.01)

(52) U.S. Cl. ............ 345/1.1; 345/55; 345/102; 345/204; 40/211; 361/679.04

(58) Field of Classification Search ............ 345/1.1–2.3; 40/212–215
See application file for complete search history.

(56) References Cited

U.S. PATENT DOCUMENTS

| | | | | |
|---|---|---|---|---|
| 4,612,720 A * | 9/1986 | Manners-Smith et al. | ..... | 40/211 |
| 5,532,711 A * | 7/1996 | Harris | ............ | 345/55 |
| 5,609,312 A * | 3/1997 | Arlton et al. | ............ | 244/17.11 |
| 6,053,658 A * | 4/2000 | Gibson, Jr. | ............ | 404/10 |
| 6,112,141 A * | 8/2000 | Briffe et al. | ............ | 701/14 |
| 7,094,124 B1 * | 8/2006 | Rouse | ............ | 446/220 |
| 7,288,469 B2 * | 10/2007 | Sharma et al. | ............ | 438/584 |
| 7,309,048 B2 | 12/2007 | von Thal et al. | | |
| 7,333,030 B2 | 2/2008 | Baranov et al. | | |
| 2002/0084995 A1* | 7/2002 | Chung | ............ | 345/204 |
| 2002/0109045 A1* | 8/2002 | Beach et al. | ............ | 244/33 |
| 2004/0155854 A1* | 8/2004 | Ma et al. | ............ | 345/102 |
| 2004/0252476 A1* | 12/2004 | Dingman | ............ | 361/825 |

(Continued)

FOREIGN PATENT DOCUMENTS

DE 298 00 381 5/1998

(Continued)

OTHER PUBLICATIONS

International Search Report and Written Opinion, PCT Application No. PCT/US07/76437, date of mailing May 21, 2008 (8 pages).

(Continued)

*Primary Examiner* — Alexander S Beck
*Assistant Examiner* — Charles V Hicks
(74) *Attorney, Agent, or Firm* — Perkins Coie LLP

(57) ABSTRACT

Airborne transmission/reception arrays and associated systems and methods are disclosed. An airborne image display device in accordance with one embodiment includes a plurality of electrically interconnected display units, with individual display units including at least one flexible support member mountable to an exterior surface of an airborne device. The display unit can further include a plurality of pixel carriers supported by the flexible support member, with each pixel carrier having multiple, spaced apart pixels. In other embodiments, the systems can include other transmission/reception arrays, for example, radar arrays or solar arrays, in lieu of the display device.

34 Claims, 11 Drawing Sheets

FIG. 4

U.S. PATENT DOCUMENTS

| | | | |
|---|---|---|---|
| 2005/0134524 A1* | 6/2005 | Parker et al. | 345/1.1 |
| 2005/0264472 A1* | 12/2005 | Rast | 345/30 |
| 2007/0044355 A1* | 3/2007 | Shofner et al. | 40/212 |
| 2007/0069941 A1 | 3/2007 | Pearlman et al. | |
| 2007/0236489 A1* | 10/2007 | Jung et al. | 345/418 |

FOREIGN PATENT DOCUMENTS

| | | |
|---|---|---|
| DE | 103 11 224 | 9/2004 |
| DE | 20 2006 003102 | 7/2006 |
| GB | 2 143 983 | 2/1985 |
| WO | WO-98/20480 | 5/1998 |
| WO | WO-2006/023754 | 3/2006 |

OTHER PUBLICATIONS

European Search Report, European Application No. 07814305.4, filed Mar. 23, 2009, date of mailing Sep. 22, 2010 (10 Pgs.).

* cited by examiner

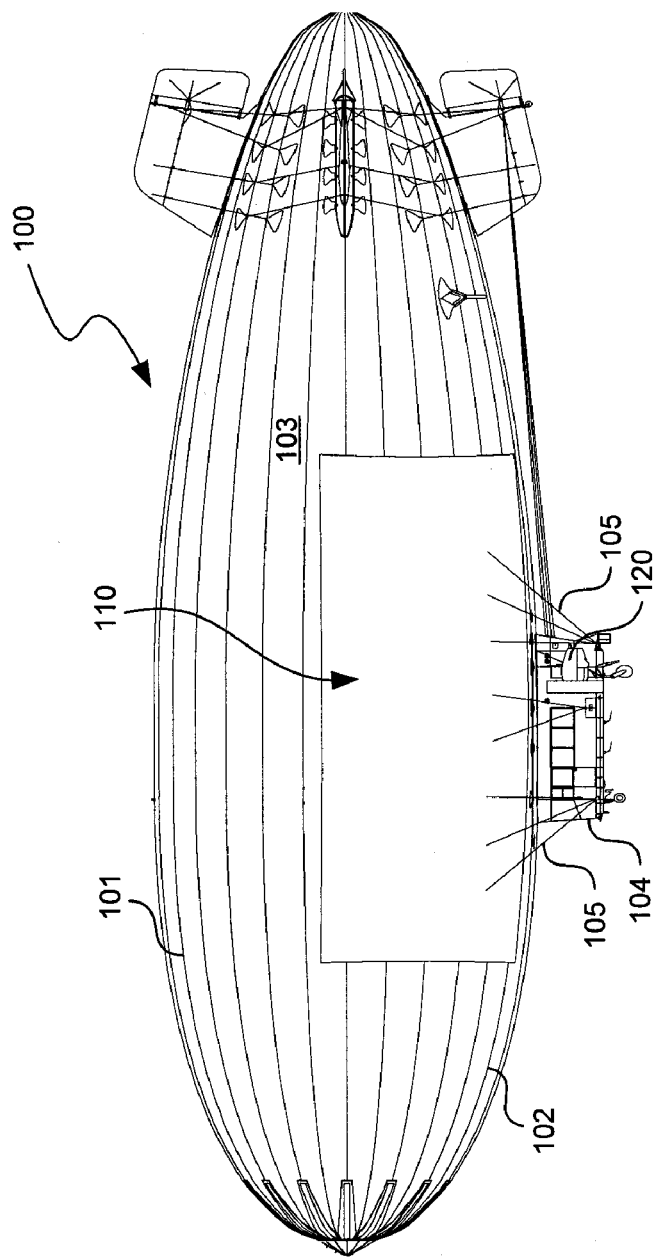
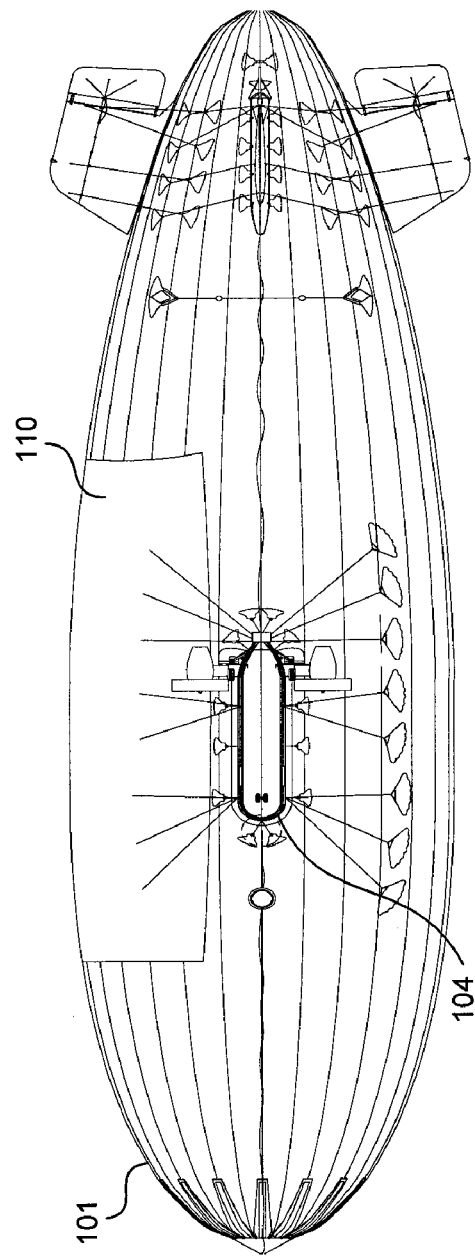
FIG. 1
FIG. 2

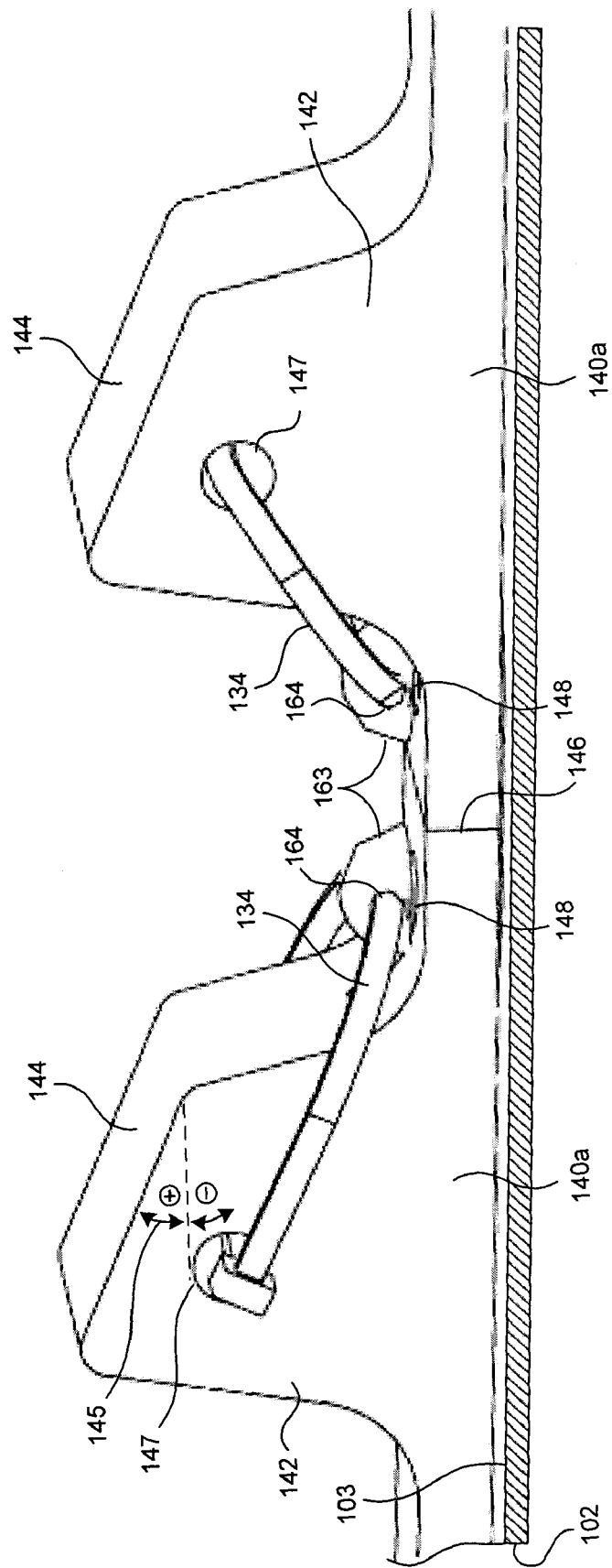

AIRBORNE EMITTER/RECEIVER ARRAYS, AND ASSOCIATED SYSTEMS AND METHODS

CROSS-REFERENCE TO RELATED APPLICATION

The present application claims priority to U.S. Provisional Application No. 60/840,172, filed Aug. 25, 2006 and incorporated herein by reference.

TECHNICAL FIELD

The present disclosure is directed generally to airborne emitter/receiver arrays, and associated systems and methods, including arrays of panels that can be carried by a blimp and used for video displays.

BACKGROUND

Airborne vehicles have long been used to display information for advertising and other purposes. For example, fixed-wing aircraft have been used to tow airborne signs, and blimps have been used to display lighted signs. Recently, blimps have also been used to display moving images. Existing display systems for blimps include arrays of thousands of pixels that are attached to the outer surface of the blimp and are driven by a video controller in much the same manner as are large video screens at sports stadiums. While this arrangement has proven reasonably effective for displaying video images, it is in many cases difficult or cumbersome to install and/or maintain. Accordingly, there is a need for improved airborne display devices.

BRIEF DESCRIPTION OF THE DRAWINGS

FIG. 1 is a partially schematic, side elevation view of an airborne display system that includes a display device carried by a blimp, in accordance with an embodiment of the invention.

FIG. 2 is a bottom view of the airborne display system shown in FIG. 1.

FIGS. 7A-7E illustrate attachment arrangements configured in accordance with several embodiments of the invention.

DETAILED DESCRIPTION

Figure 3:
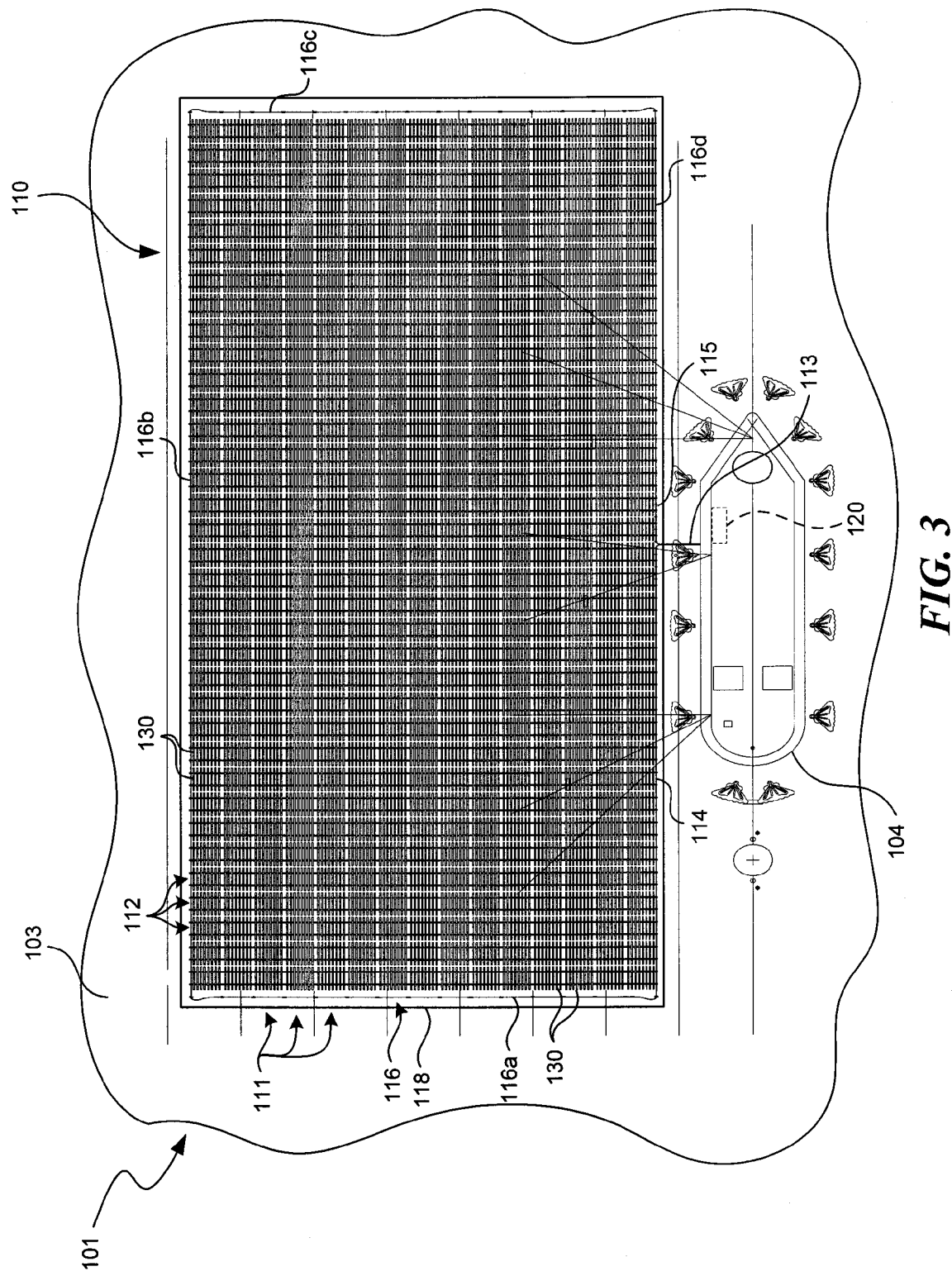
FIG. 3 is a bottom view of an embodiment of the display device shown in FIG. 2, flattened for purposes of illustration.

The present disclosure is directed generally to airborne transmission/reception arrays, and associated systems and methods. Specific details of several embodiments of the invention are described below with reference to FIGS. 1-8 in the context of a video display device carried by a blimp, to provide a thorough understanding of these embodiments. In other embodiments, the invention can have other arrangements. Several details describing structures or processes that are well-known and often associated with display devices are not set forth in the following description for purposes of brevity. Moreover, although the following disclosure sets forth several embodiments of different aspects of the invention, other embodiments of the invention can have different configurations or different components than those described in this section. As such, the invention may have other embodiments with additional elements or without several of the elements described below with reference to FIGS. 1-8.

FIG. 1 is a side elevation view of an airborne display system 100 configured in accordance with an embodiment of the invention. The system 100 can include a blimp 101 having an envelope 102 that contains helium or another buoyant gas. A display device 110 is conformally attached to the curved external surface 103 of the envelope 102, and can be configured to display video images under the direction of a controller 120. The controller 120 (as well as the blimp pilot and, optionally, other personnel) can be housed in a gondola 104. The gondola 104 can be secured to the blimp 101 with catenary cables 105.

FIG. 2 is a bottom view of the blimp 101, illustrating a portion of the display device 110, as well as the gondola 104. As is shown in FIG. 2, the display device 110 may be mounted on only one side of the blimp 101. Accordingly, the weight of the display device 110 may cause the blimp 101 to roll slightly to one side. This effect can be counteracted by providing sufficient control authority to control the blimp 101 despite the baseline roll offset, and by tailoring specific systems of the blimp 101 to account for the roll offset. Such systems include indicator lights, which may be deliberately oriented to account for the baseline roll offset of the blimp 101. Of course, in other embodiments, the blimp 101 can include other arrangements, including ballast on the side of the blimp 101 opposite the display device 110, or two display devices 110, one on each side of the blimp 101.

FIG. 3 is an enlarged view of a portion of the blimp 101 shown in FIG. 2, with the external surface 103 of the blimp unrolled or flattened so that the entire display device 110 is visible. The display device 110 can include an array of electrically interconnected display units 130. The display units 130 can be arranged in a rectilinear array of rows 111 and columns 112. In an embodiment shown in FIG. 3, the display device 110 includes an array of fifteen rows 111, and thirty-five columns 112. Each display unit 130 can be approximately two feet wide and two feet high, so that the overall size of the illustrated display device 110 is about seventy feet from front to back, and about thirty feet from top to bottom. In other embodiments, the size and shape of each display unit 130 can be different. The number of rows 111 and columns 112 can also be different, and/or the display device 110 can have shapes other than the rectilinear shape shown in FIG. 3. In any of these embodiments, individual display units 130 can be readily attached to the external surface 103 during initial installation, and can be readily repaired and/or replaced during routine maintenance. In particular, the display units 130 can have a modular construction as described in greater detail later with reference to FIGS. 4-7.

Still referring to FIG. 3, the external surface 103 can include a backing layer 118 (e.g., a vinyl decal), which can be black or can have another dark color to provide for good contrast with the images presented at the display device 110. The display device 110 can also include a perimeter lightning protection cable 116 that extends around the perimeter of the display device 110. The perimeter lightning protection cable 116 can include a forward segment 116a, a top segment 116b, an aft segment 116c and a bottom segment 116d. The bottom segment 116d can be combined with a forward cable harness 114 and an aft cable harness 115. The cable harnesses 114, 115 together provide power and signals to display units 150 located in forward and aft columns 112, respectively. The forward cable harness 114 and the aft cable harness 115 are collected in a communication cable harness 113. The communication cable harness 113 is connected to the controller 120 (shown schematically in FIG. 3), which is housed in the gondola 104. Further details of the display units 130 are described below with reference to FIGS. 4-7, and further details of the controller 120 are described below with reference to FIG. 8.

Figure 4:
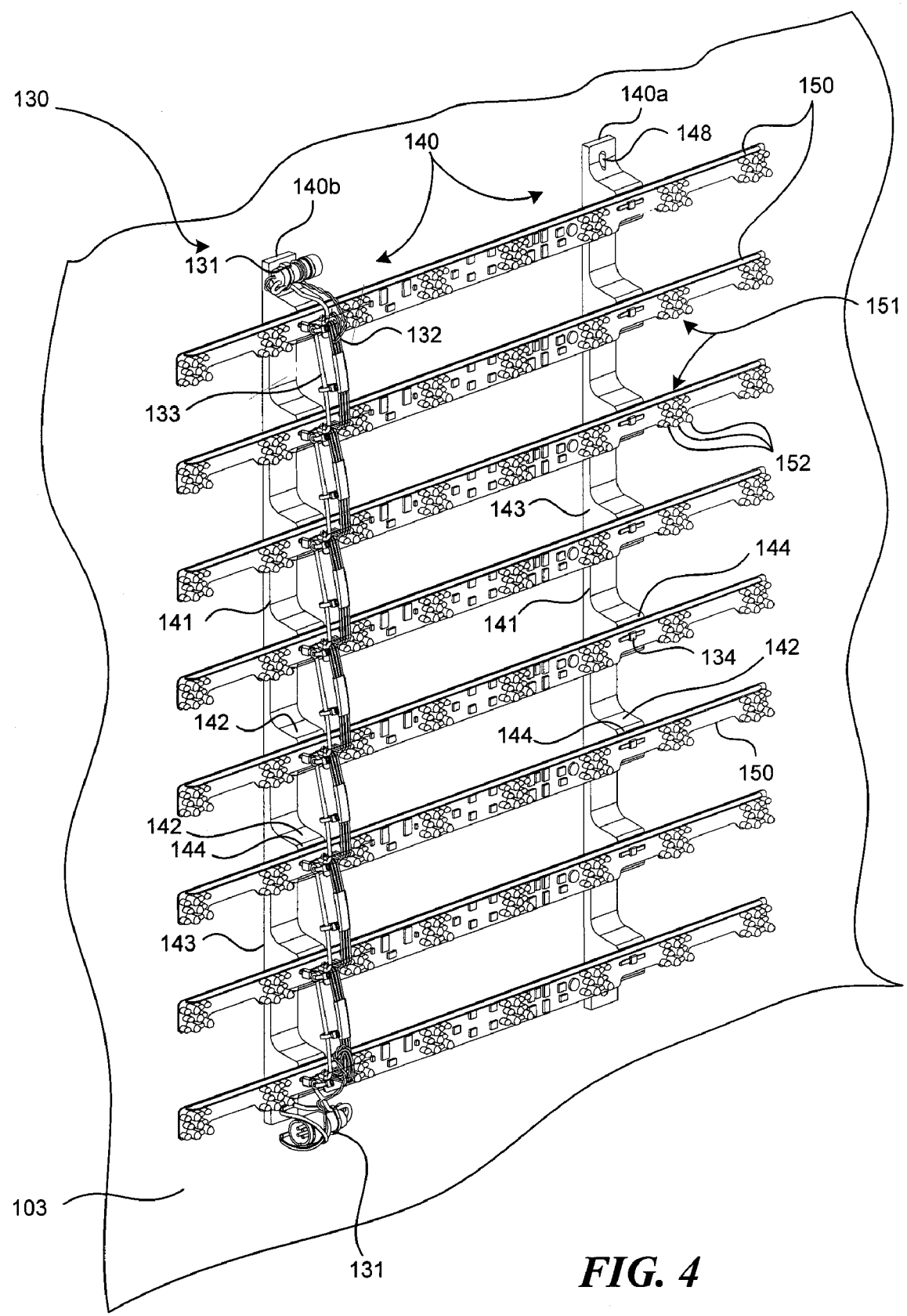
FIG. 4 is a partially schematic, isometric illustration of a display unit that may in combination with other display units form a display device in accordance with an embodiment of the invention.

FIG. 4 is an isometric illustration of one of the display units 130 shown in FIG. 3. The display unit 130 can include multiple carriers (e.g., pixel carriers) 150, each of which carries multiple pixels 151. In the illustrated embodiment, the pixel carriers 150 form a "Venetian blind" arrangement. For purposes of illustration, the carriers are discussed below in the context of pixel carriers, which carry the pixels 151. In other embodiments, the carriers can carry other signal devices, for example, radar emitters or solar cells. In an embodiment in which the carriers 150 carry pixels 151, each of the pixels 151 can include multiple light sources 152 (e.g., LEDs). In a particular embodiment, each of the pixel carriers 150 includes eight pixels 151, and each display unit 130 includes eight pixel carriers 150, for a total of sixty-four pixels 151 for each display unit 130. In other embodiments, the number of pixels 151 per carrier 150 and/or the number of carriers per display unit 130 can be different. Individual pixels 151 can be spaced apart from each other (both horizontally and vertically) by a distance selected to provide the appropriate resolution for the viewer. For example, when the display units 130 are to be carried by a blimp that cruises at an altitude of about 1000 feet during display operation, the pixels 151 can be spaced apart by about three inches, horizontally and vertically, to provide good resolution to a viewer on the ground.

Signal wires 132 and power wires 133 transmit signals and power, respectively, to each of the pixels 151, and can be grouped together toward one side of the display unit 130. The wires 132, 133 can terminate at corresponding electrical connectors 131 located at the top and bottom of the display unit 130. The connector 131 located at the top of the display unit 130 is then connected to a corresponding connector located at the bottom of the neighboring display unit (not shown) located just above the display unit 130 shown in FIG. 3. The connector 131 located at the bottom of the display unit 130 is connected to a corresponding connector located at the top of another neighboring display unit (not shown) located just below the display unit 130 shown in FIG. 3.

Each display unit 130 can also include one or more flexible support members 140 (two are shown in FIG. 4 as a first flexible support member 140a and a second flexible support member 140b). Each of the flexible support members 140 can be formed from a plastic-coated foam material or other suitable flexible material. For example, the flexible support member 140 can be formed from a material generally similar to that used for portable stadium seat cushions, water skiing life preservers, and beverage cup insulators. Each flexible support member 140 can include an elongated base 141 and multiple stand-offs 142 that extend away from the base 141. The base 141 can include a first surface 143 that abuts the blimp external surface 103. The base 141 can include a mounting hole 148 for attaching the support member 140 to the external surface 103, as will be described in greater detail below with reference to FIGS. 7A-7B.

Each of the stand-offs 142 can include a second surface 144 that abuts the pixel carrier 150 and faces away from the first surface 143. The second surface 144 can have a selected tilt orientation relative to the first surface 143. In this manner, the orientation of each pixel carrier 150 (or group of pixel carriers 150) can be selected and fixed upon installation. This feature can be of particular value when the display units 130 are mounted on a curved external surface 103, as is the case when the external surface 103 forms the envelope of a blimp. In a particular example, display units 130 positioned toward the middle of the display device 110 (FIG. 3) have second surfaces 144 that are generally parallel to the first surface 143. Due to the curvature of the external surface 103 at this location, the pixel carriers 150 of these display units 130 can face downwardly at an angle of about 45° below horizontal. Display units 130 above the middle of the display device 110 can have tilt orientations that gradually increase in one direction (e.g., up to about +37.5° with respect to the external surface 103), and display units 130 below the middle of the display device 110 can have tilt orientations that gradually increase in the opposite direction (e.g., up to about −37.5° with respect to the external surface 103). Clearly, the foregoing ranges will be different for display devices 110 having different sizes and/or orientations, and for external surfaces 103 having different degrees of curvature. In any of the foregoing embodiments, the tilt orientation of the second surface 144 can be the same for all stand-offs 142 in a given display unit 130, or can vary within a given display unit 130, depending on factors that can include the sensitivity of the viewer to angular variations in the light emitted by the pixels 151, and/or the angular range over which the pixels 151 best emit light.

Each pixel carrier 150 can be attached to the stand-offs 142 with straps 134, for example, cable ties or other suitable devices. Accordingly, the pixel carriers 150 are held in place relative to the flexible support members 140. The compliant nature of the flexible support members 140 can accommodate changes in the shape of the external surface 103, as will be described later. The first and second flexible support members 140a, 140b can have generally similar configurations, with the second flexible support member 140b carrying the power wires 133 and the signal wires 132. In other embodiments, each display unit 130 can include more than two flexible support members 140, or in particular cases, just a single flexible support member 140. For example, in a particular embodiment, the flexible support member can include a single pliable sheet or layer of webbing that releasably supports the pixel carriers 150.

Figure 5:
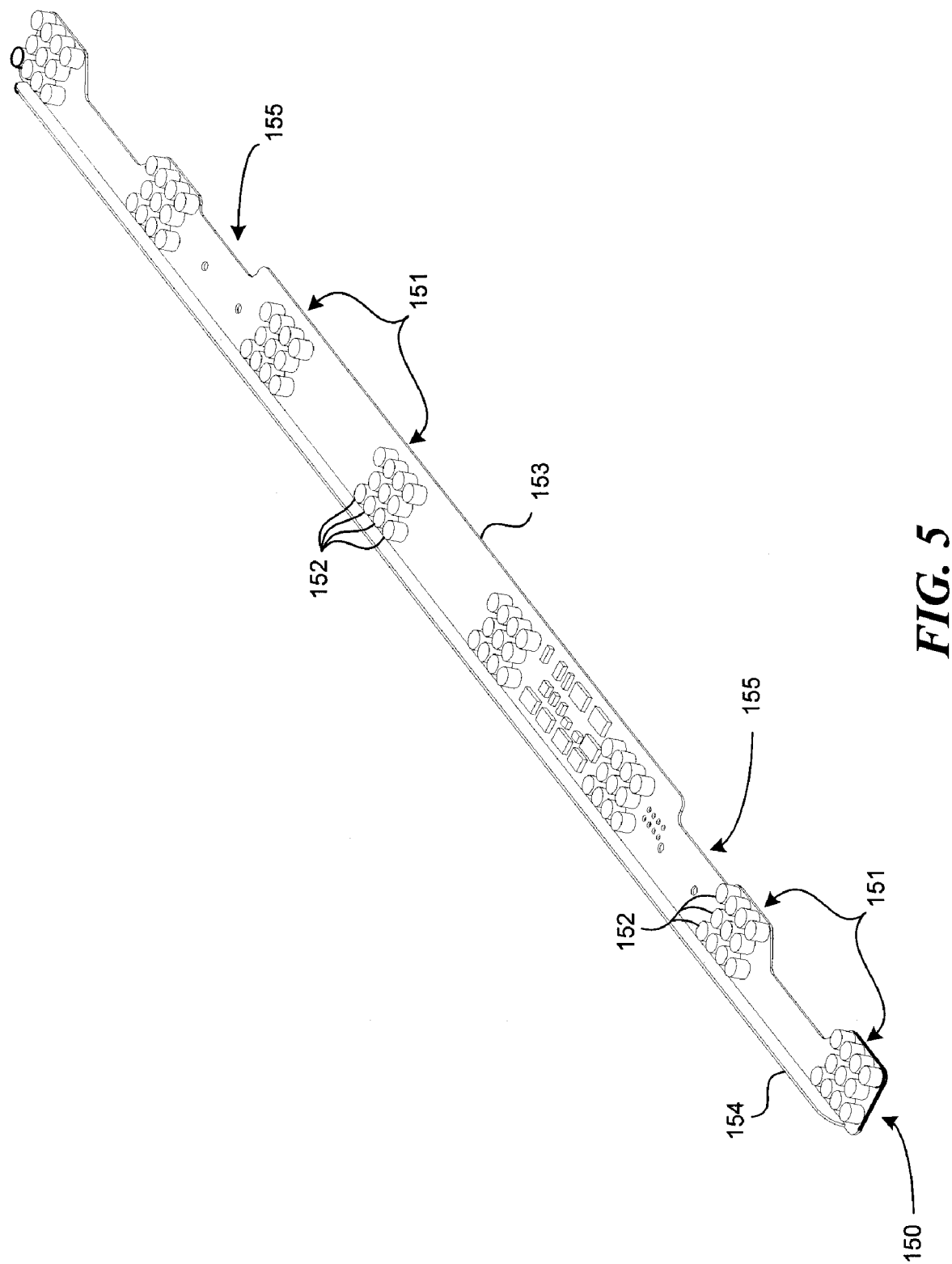
FIG. 5 is an isometric illustration of a pixel carrier that forms a part of the display unit shown in FIG. 4 in accordance with an embodiment of the invention.

FIG. 5 is an isometric illustration of one of the pixel carriers 150 shown in FIG. 4. Each pixel 151 carried by the pixel carrier 150 can include multiple light sources 152 which, in one embodiment, include LEDs, and in other embodiments, include other devices. In an arrangement shown in FIG. 5, each pixel 151 can include eleven light sources 152 arranged to provide for full color displays in a variety of conditions. For example, each pixel 151 can include a red LED, a green LED and a blue LED for full color video at night, or for low light use. Each pixel 151 can also include eight additional red LEDs provided specifically for day time use. In operation, the three "RGB" LEDs are used at night or during low light conditions, and the eight red LEDs are used during the daytime, as red is expected to provide better visual contrast during daytime use. In other embodiments, each pixel 151 can have other combinations of LEDs or other light sources, depending on factors that include the characteristics of the light sources and/or the intended use for the pixels 151.

The pixel carrier 150 can be formed from a suitable substrate, for example, a circuit board 153, which also includes circuitry for routing signals to the pixels 151 from the signal wires 132 (FIG. 4). The circuitry can in turn include electronic components that interpret incoming signals to determine which pixels 151 to power and which light sources 152 within each pixel to power. These components can accordingly also distinguish signals intended for one display unit 130 (FIG. 4) from signals intended for another, in a manner generally analogous to that of individual computers on a network accessing only signals intended for those individual computers. The circuit board 153 can have cut-outs 155 or other lightening features to reduce its weight. The cut-outs 155 can extend inwardly from the edges of the circuit board 153, and/or can include holes at the interior of the circuit board 153. Circuit traces in the circuit board 153 are accordingly routed around the cut-outs 155. The circuit board 153 can also be extremely thin. Accordingly, in some cases, the pixel carrier 150 can include a stiffener 154 to prevent the thin circuit board 153 from fluttering or otherwise deflecting in an undesirable manner during use. The stiffener 154 can also be made from circuit board material that is soldered or otherwise affixed to the circuit board 153. In other embodiments, the stiffener 154 can include other light-weight materials that also provide a stiffening function. In addition to increasing the strength of the pixel carrier 150, the stiffener 154 can project from an outwardly facing surface of the pixel carrier 150 and act as a visor to shield or at least partially shield the pixels 151 from interference caused by ambient light. Accordingly, the stiffener 154 can be sized to perform one or both of the foregoing functions. In any of these embodiments, the pixel carrier 150 can be coated with a suitable environmental coating to reduce degradation due to exposure to varying and/or harsh weather conditions.

Figure 6:
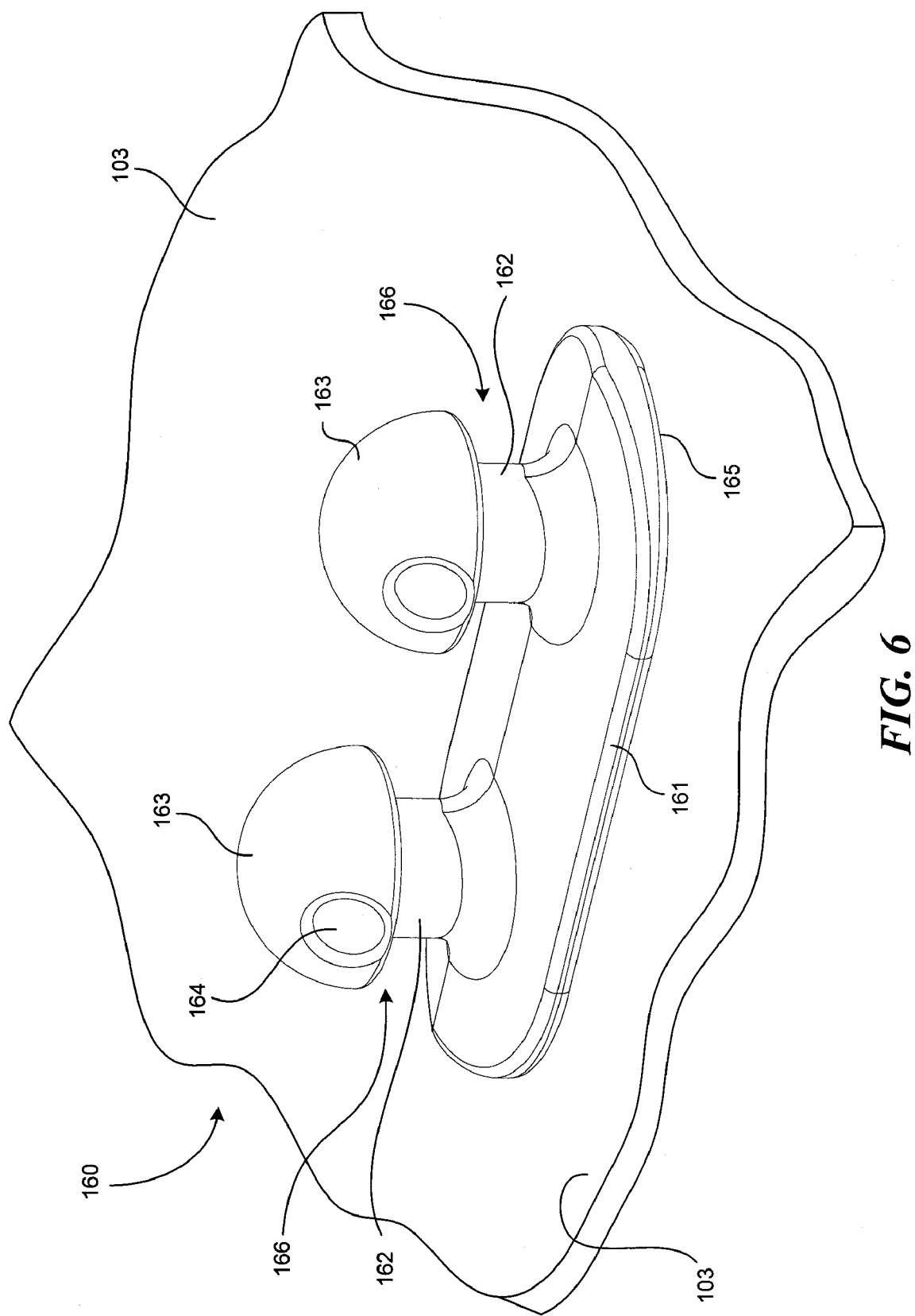
FIG. 6 is an isometric illustration of a fastener that can be used to attach display unit support members to a surface in accordance with an embodiment of the invention.

FIG. 6 illustrates a fastener 160 which can be used to attach the flexible member 140 described above with reference to FIG. 4 to the blimp external surface 103. Each fastener 160 can include a fastener base 161 attached to the blimp external surface 103 with an adhesive 165. Each fastener 160 can also include one or more projections 166 (two are shown in the illustrated embodiment), each of which in has a stem 162 and a head 163. The head 163 can include a through-hole 164 which receives a strap that connects the fastener 160 to one of the support members 140 (FIG. 4). In practice, the fastener 160 can be positioned at the juncture between two display units 130 (FIG. 3) located in the same column 112 (FIG. 3). Further details of arrangements for attaching the support members 140 to the fasteners 160 are described below with reference to FIGS. 7A-7E.

FIG. 7A illustrates a fastener 160 adhesively attached to the blimp external surface. The fastener 160 is releasably attached to the end portions of two first flexible support members 140a, each of which forms a portion of a display unit 130 located in the same column 112 (FIG. 3). For purposes of illustration, the pixel carriers 150 carried by the first support members 140a are not shown in FIG. 7A. Each first flexible support member 140a includes a mounting hole 148 which is stretched over a corresponding one of the fastener heads 163. The first flexible support member 140a toward the right of FIG. 7A is then stretched to the right and attached to another fastener 160 not visible in FIG. 7A. The first flexible support member 140a positioned toward the left of FIG. 7A is stretched to the left and attached to another corresponding fastening 160 also not visible in FIG. 7A. Accordingly, each of the first flexible support members 140a can be held in tension between the fastener 160 visible in FIG. 7A and the corresponding fasteners positioned to the right and left of FIG. 7A. The two first flexible support members 140a can abut at a junction 146.

Each first flexible support member 140a can be further secured to the fastener 160 with a strap 134 that passes through the through-hole 164 of the fastener head 163, and through a support member hole 147 located in the standoff 142 of each flexible support member 140a. Each standoff 142 can have a second surface 144 that is inclined at an inclination angle 145 relative to the first attachment surface 143. As discussed above, the inclination angle 145 can vary from one support member 140 to another (or from one stand-off 142 to another) to orient the adjacent pixel carrier at the proper viewing angle.

Figure 7B:
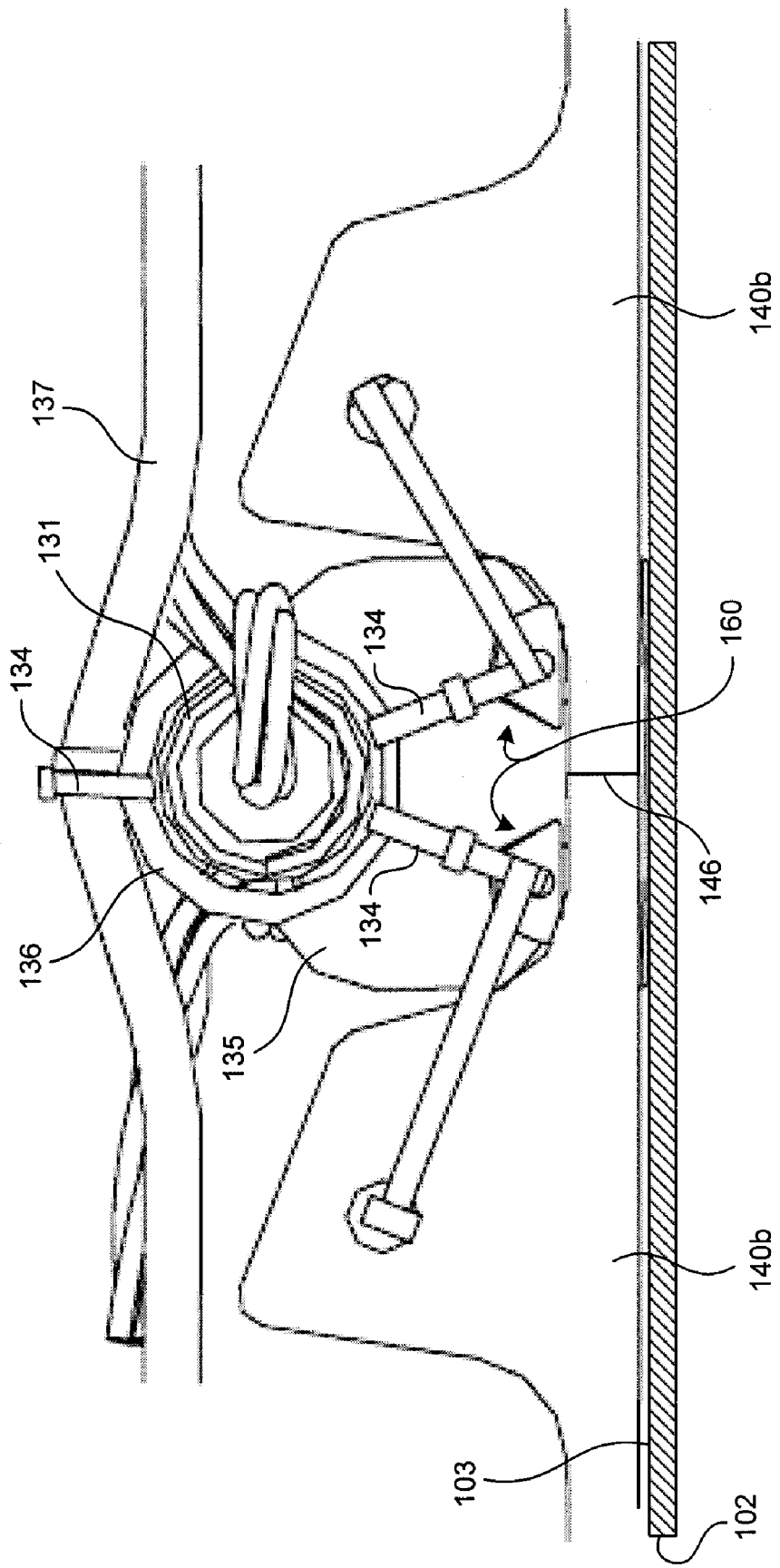

FIG. 7B illustrates two second support members 140b attached to a common fastener 160 and abutting at a corresponding junction 146. Each of the second support members 140b is attached to the fastener 160 using a technique generally similar to that described above with reference to the first support members 140a shown in FIG. 7A. The fastener 160 can also support electrical cabling. In particular, the fastener 160 can be attached to a cradle 135 (with straps 134), and the cradle 135 can in turn hold a support ring 136 that carries the connector 131. A column lightning protection cable 137 can also be supported by the cradle 135 with a corresponding strap 134. A separate column lightning protection cable 137 can be provided for each of the columns 112 (FIG. 3) to supplement the lightning protection provided by the perimeter lightning protection cable 116 (FIG. 3).

Figure 7C:
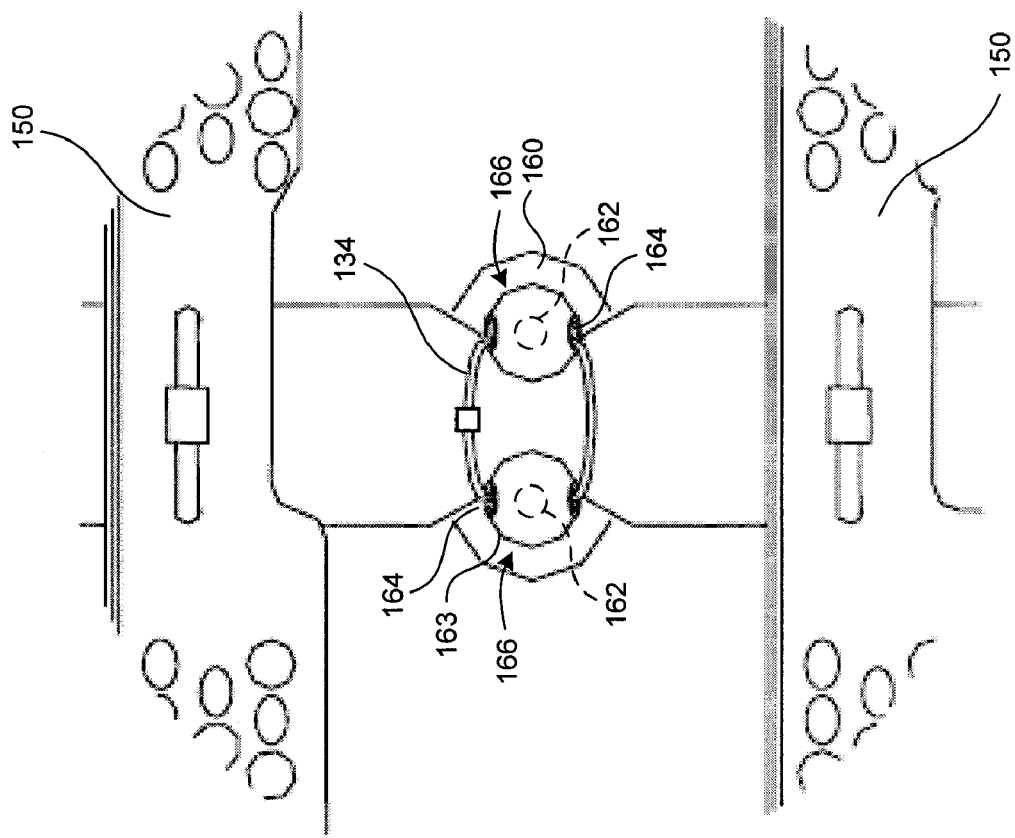

The fasteners 160 can also be positioned at intermediate locations along the length of either the first support members 140b or the second support members 140a. For example, FIG. 7C illustrates a fastener 160 that has each projection 166 located on opposite sides of a first support member 140a. The first support member 140a, which is flexible and resilient, is squeezed between the stems 162 of the corresponding projections 166, and can be further restricted from movement by a strap 134 that passes through the through-holes 164 of each of the heads 163.

Figure 7D:
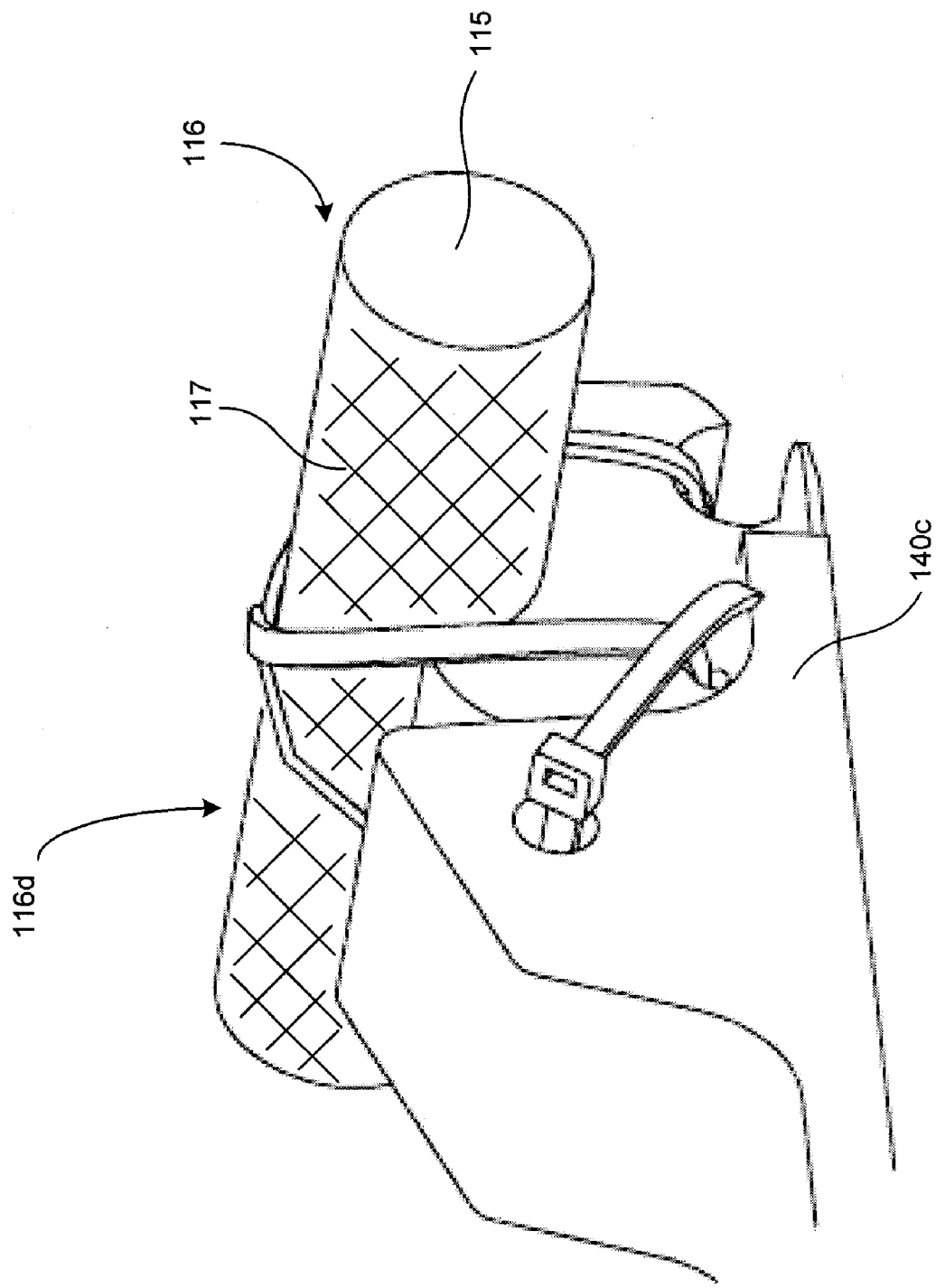

FIG. 7D illustrates the end of a first flexible support member 140c that is positioned at the bottom of one of the columns 112 shown in FIG. 3. This particular first flexible support member 140c can support the forward cable harness 115, which runs along the bottom of the display device 110 (FIG. 3). The forward cable harness 115 can include overbraiding 117 that forms the lower segment 116d of the perimeter lightning protection cable 116 (FIG. 3).

Figure 7E:
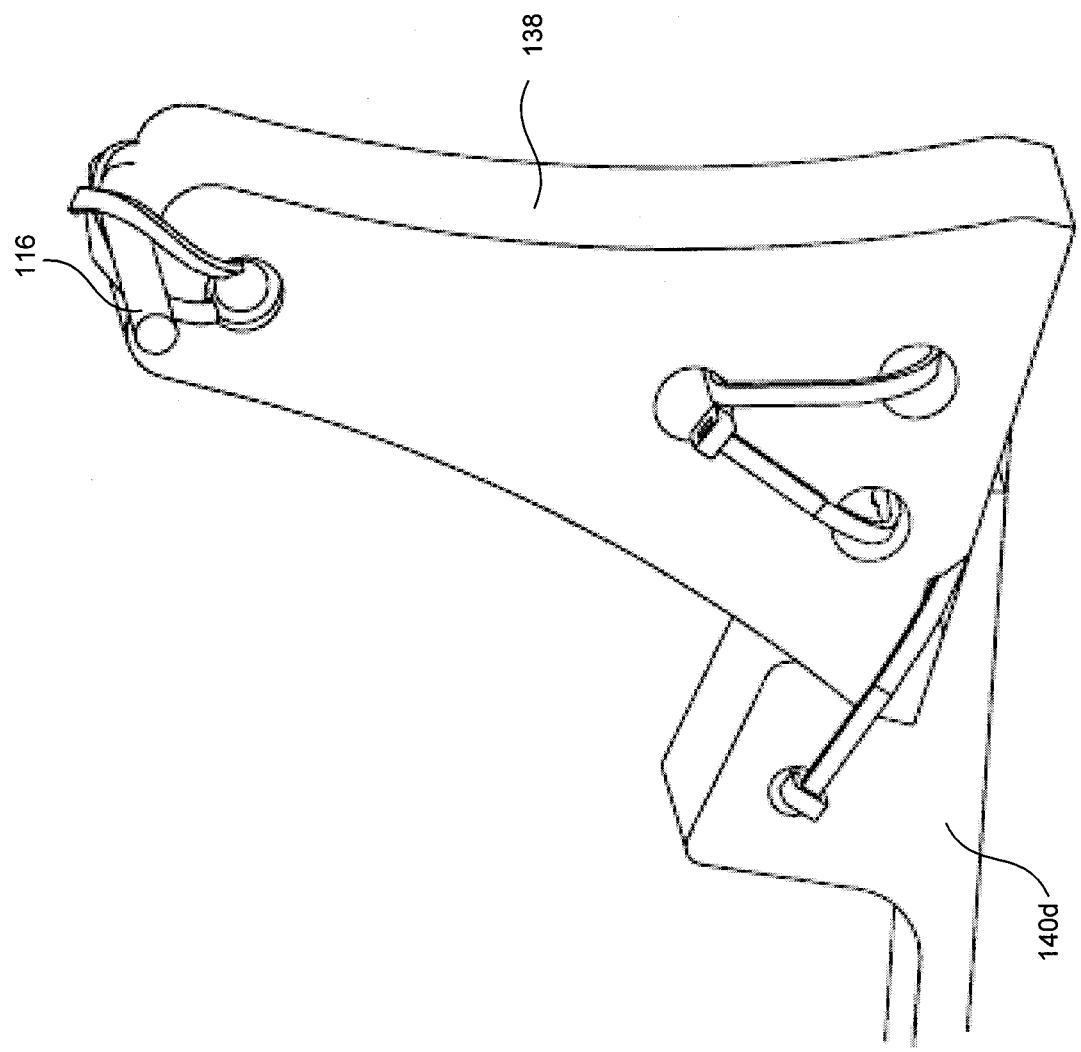

FIG. 7E illustrates a first flexible support member 140d positioned at the top of one of the columns 112 shown in FIG. 3. This first support member 140d can be attached to a lightning standoff 138 that in turn supports the perimeter lightning protection cable 116 as it extends along the upper edge of the display device 110 shown in FIG. 3.

Aspects of the foregoing arrangements described above with reference to FIGS. 1-7E can provide several benefits when compared with existing systems. For example, the arrangement of strip-shaped pixel carriers 150 is relatively light in weight. Features that contribute to the light weight include the wide spaces between neighboring strips, the thinness of the strips, and the cutouts in the strips. In a particular embodiment, a display device 110 can have a weight that is only 4% of a similarly sized, ground-based device (e.g., such as a sports stadium display). Furthermore, the strip-shaped circuit board (e.g., having dimensions of about one inch by about twenty-three inches) can be easily manufactured with existing automated circuit board equipment.

Another feature of certain of the foregoing embodiments described above with reference to FIGS. 1-7E in that the display (or other signal device) units 130 can be modular. For example, each display unit 130 can be electrically identical, and each pixel carrier 150 can be electrically identical. Accordingly, if a pixel carrier 150 is defective, it can be easily removed from the display device 110 and replaced. If an entire display unit 130 is defective, it can also be easily removed and replaced. Because different display units 130 may have support members 140 with second surfaces 144 that are oriented at different angles, the user can simply replace the existing support members 140 with support members 140 having the appropriately oriented second surfaces 144. In one embodiment, the support surfaces 144 can have one of fifteen pre-defined angular orientations. In other embodiments, this number can be greater or smaller depending (for example) on the size of the display device 110 and/or the curvature of the surface to which it is mounted. In any of these embodiments, the support members 140 can be easily removed and replaced by detaching them from the fasteners 160. In a particular embodiment, the fasteners 160 can provide the only direct connection between the support members 140 and the mounting surface to which the support members 140 are coupled. Accordingly, the user need not disturb the mounting surface when making a replacement.

Another feature of at least some of the foregoing embodiments is that the support members 140 are flexible. This can allow the support members 140 to easily conform to a surface having a compound curvature. As a result, the shape of the corresponding display unit 130 can change from a rectangular shape to another shape (e.g., to a parallelogram shape) to account for the curvature of the underlying exterior surface 103. The support members 140 can also be elastically resilient, which can allow them to be stretched as they are attached between corresponding fasteners 160. Stretching the support members 140 and passing the fastener heads 163 entirely through the support member mounting holes 148 can securely attach the support members 140, and threading the straps 134 through these components can further secure the connection. The flexibility and resilience of the support members 140 also allows the display units 130 to accommodate changes in the shape and size of the exterior surface, for example, as the gas in the blimp 101 expands, contracts or enters or exits the blimp 101. Even as the blimp 101 changes shape, the spacing between neighboring pixel carriers 150 can remain consistent. In other words, while the distance between neighboring pixel carriers 150 may change, the distance between any two neighboring pixel carriers 150 will generally be the same as that between any other two, due at least in part to the resilient nature of the support members 140.

Another feature of certain embodiments of the devices described above with reference to FIGS. 1-7E is that they can include lightning protection, for example, via the perimeter lightning protection cable 116 and/or the column lightning protection cables 137. The cables 116, 137 can be heavy gauge (e.g., six gauge) to handle high current loads. The cables 116, 137 can be offset from the blimp exterior surface 103 (as are the other electrical/electronic components of the display device 110) by the electrically non-conductive support members 140 so that in the event of a lightning strike, the likelihood for damage to the exterior surface 103 is reduced or eliminated. In particular embodiments, the offset distance can be from about one inch to about four inches, and in other embodiments, the offset can have other values. In any of these embodiments, the lightning protection cables can be grounded to the gondola frame. By providing lightning protection cabling at frequent locations around and throughout the display panel 110, lightning can be guided away from the electronic components of the display panel 110 and to ground.

Figure 8:
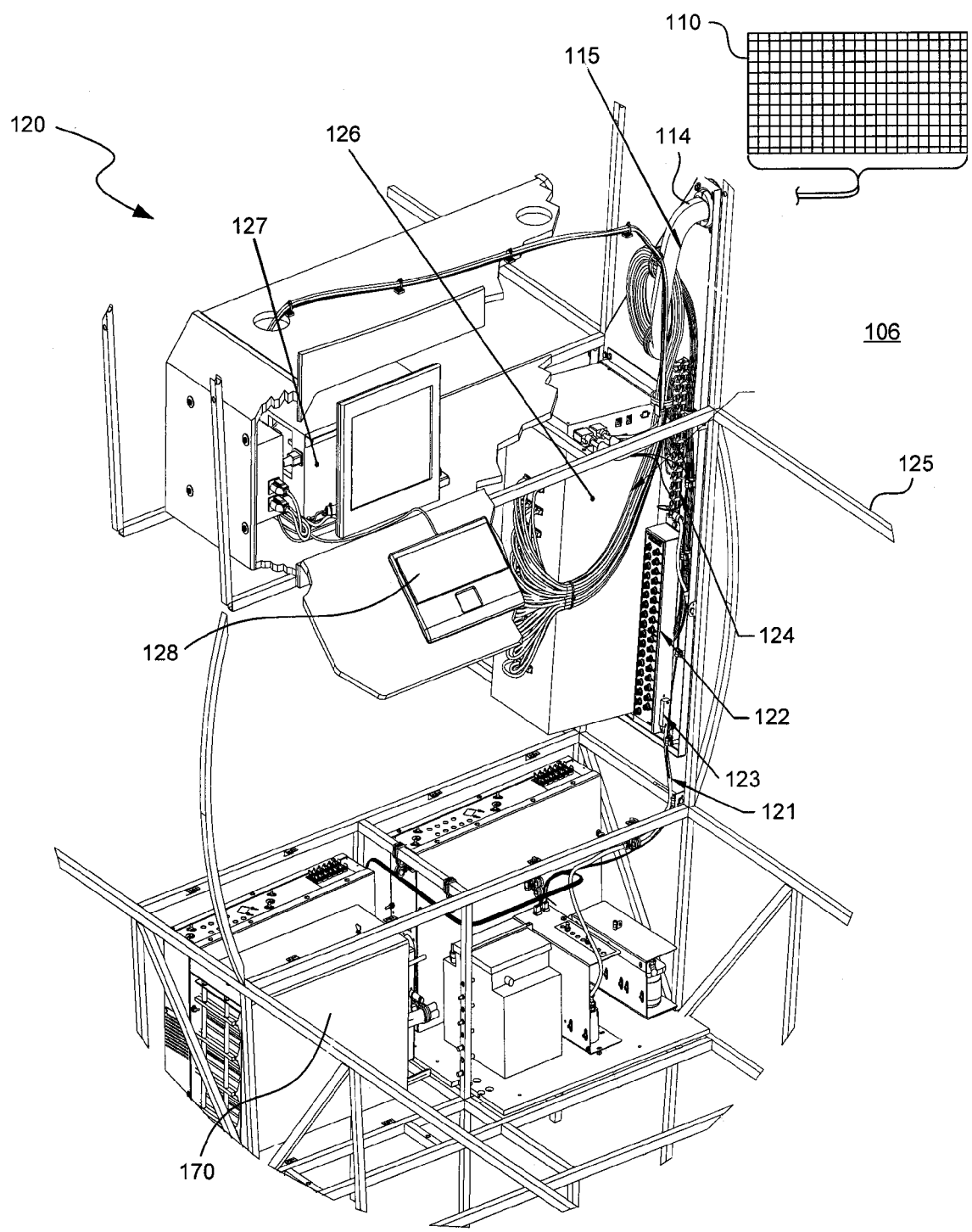
FIG. 8 is a partially schematic, isometric illustration of a controller and associated subsystems, configured to control an airborne display in accordance with an embodiment of the invention.

FIG. 8 schematically illustrates the display device 110 along with a representative layout for components the controller 120, in accordance with an embodiment of the invention. The controller 120 can include a computer 127 and a video controller 126 that together provide input signals to the display device 110. A user can enter instructions and/or information at an input terminal 128 to control the information presented at the display device 110. In one embodiment, the information presented at the display device 110 can be based on content derived from on-board the blimp 101 (FIG. 1). For example, the content can be provided by a camera carried by the blimp 101, or by on-board computer-readable media accessed by the computer 127. In other embodiments, the content can be received from a source off-board the blimp 101, via appropriate telemetry and/or other wireless communication links. For example, the blimp 101 can be outfitted with antennae that receive uplinked television signals from cameras located on the ground or elsewhere. In other embodiments, the content can be obtained directly from the internet or other sources (e.g., individuals, groups, or institutions) via a wireless link. Such links can include RF links, IR links, microwave links or others.

In particular embodiments, the video controller 126 can include a voltage sensor that is operatively coupled to an autodimming switch. The autodimming switch can be a software device, firmware device, or hardware device. In any of these embodiments, the autodimming switch can automatically reduce power to the display device 110 if the power requirements for presenting content at normal brightness levels exceed a threshold level for a predetermined period of time. This feature (in addition to or in lieu of the capacitors described below) can reduce the likelihood for overtaxing airborne power generators, and/or reducing the power available to other airborne systems.

Signals and power are provided by the forward and aft cable harnesses 114, 115, which can pass through a wall 106 of the gondola 104 to the display device 110. The wall 106 can be attached or adjacent to an equipment chassis 125 that supports other devices used to provide and condition the power and signals delivered to the display device 110. These other devices can include a ground terminal strip 124, a power circuit breaker box 122, and surge protectors 123. The surge protectors 123 can provide additional lightning protection to supplement that provided by the lightning protection cables 116, 137 (FIGS. 1 and 7B, respectively).

Power is provided via a power harness 121, which can also be operatively coupled to a capacitor or bank of capacitors 170. In particular embodiments, the capacitors 170 can include ultracapacitors, such as are available from Maxwell Technologies of San Diego, Calif. The capacitors 170 can accordingly smooth out the fluctuating loads placed on the blimp power supply, which is typically an electrical generator. These fluctuations may result from widely varying power requirements of the display device 110. For example, if a video image presented at the display 110 is entirely white (e.g., for a snow scene or an explosion scene), all the pixels and all the light emitters for each pixel will typically require power. Conversely, if a dark scene is shown on the display device 110, none of the pixels will require power, or will require power at very low levels. The ultracapacitors can prevent such rapid changes in power demands from adversely affecting the electrical generator by rapidly storing and rapidly discharging large amounts of electrical energy. For example, representative ultracapacitors can store and discharge electrical energy at a rate of 5,000 amps, at a potential of 28 volts. This arrangement can not only protect the electrical generator against significant power demand fluctuations, but can also preserve power for other electrical systems on the blimp.

From the foregoing, it will be appreciated that specific embodiments of the invention have been described herein for purposes of illustration, but that various modifications may be made without deviating from the invention. For example, the display device can be replaced with an array of other types of signal emitters, including but not limited to, a phased radar arrangement. In still further embodiments, the signal emitters can be replaced with other types of signal devices, for example signal receivers. In a particular embodiment, the signal receivers can include solar cells. Certain aspects of the invention described in the context of particular embodiments may be combined or eliminated in other embodiments. Further, while advantages associated with certain embodiments of the invention have been described in the context of those embodiments, other embodiments may also exhibit such advantages, and not all embodiments need necessarily exhibit such advantages to fall within the scope of the invention.

We claim:

1. An airborne image display device, comprising:
    a plurality of electrically interconnected display units, with individual display units including:
        at least two flexible support members mountable to an exterior surface of an airborne device, wherein the individual flexible support members include an elongated base mountable to the exterior surface and multiple stand-offs projecting away from the elongated base, and wherein the flexible support members comprise a flexible resilient foam material; and
        a plurality of pixel carriers supported by and extending between the two flexible support members in a direction generally normal to the elongated bases of the flexible support members, wherein individual pixel carriers are carried by individual stand-offs of the corresponding flexible support members, and wherein each pixel carrier comprises multiple, spaced-apart pixels.

2. The device of claim 1 wherein neighboring pixel carriers are arranged generally parallel to each other to form an array of pixels.

3. The device of claim 1 wherein neighboring pixel carriers are oriented at different inclination angles relative to the at least two flexible support member.

4. The device of claim 1 wherein the plurality of display units includes a first display unit and a second display unit, the first display unit having first pixel carriers oriented at a first angle relative to the corresponding flexible support members, the second display unit having second pixel carriers oriented at a second angle different than the first angle relative to the corresponding flexible support members.

5. The device of claim 1 wherein each pixel includes multiple light emitting elements.

6. The device of claim 1 wherein each pixel carrier includes a generally strip-shaped section of circuit board.

7. The device of claim 6 wherein the circuit board includes a lightening opening extending through the circuit board and positioned at an edge, an interior, or both an edge and interior of the circuit board.

8. The device of claim 1 wherein each pixel carrier includes a generally strip-shaped section of circuit board and a stiffener extending away from the circuit board.

9. The device of claim 8 wherein the pixels are visually accessible from an outwardly facing surface of the pixel carrier, and wherein the stiffener projects in an outward direction away from the outwardly facing surface.

10. The device of claim 1, further comprising at least one ultracapacitor electrically coupled to the pixels.

11. The device of claim 1, further comprising a dimmer operatively coupled to the pixels to automatically reduce an output of the pixels when a power demand by the pixels exceeds a threshold condition.

12. The device of claim 1, further comprising a lightning protection cable carried by at least one of the display units.

13. An airborne image display system, comprising:
    a blimp;
    a video display screen attached to an exterior surface of the blimp, the video display screen including:
        a plurality of electrically interconnected display units, with individual display units including:
            two flexible support members, each having a first surface in contact with the blimp exterior surface, each support member further having multiple second surfaces facing away from the first surface;
            a plurality of pixel carriers supported by the flexible support members at the second surfaces, wherein the pixel carriers extend between the flexible support members in a direction generally normal to the first surfaces of the flexible support members, and wherein each pixel carrier comprises multiple, spaced-apart pixels; and
            multiple spaced apart fasteners, with individual fasteners being attached to the blimp exterior surface and being releasably attached to the flexible support members.

14. The system of claim 13 wherein the blimp exterior surface has a compound curvature, and wherein the display screen conforms to the compound curvature of the exterior surface.

15. The system of claim 13, further comprising a standoff carried by at least one of the flexible support members, and a lightning protection cable carried by the standoff, the lightning protection cable being carried at a greater distance from the exterior surface of the blimp than are the pixels.

16. An airborne system, comprising:
    a blimp;
    a signal array attached to an exterior surface of the blimp, the signal array including:
        a plurality of electrically interconnected units, with individual units including:
            at least one flexible support member releasably attached to the exterior surface of the blimp;
            a plurality of signal device carriers supported by the flexible support member, wherein the signal device carriers extend generally perpendicular to a longitudinal axis of the flexible support member, and wherein each signal device carrier comprises multiple, spaced-apart signal devices; and
            multiple spaced apart fasteners, with individual fasteners being attached to the blimp exterior surface and being releasably attached to the flexible support member.

17. The system of claim 16 wherein the signal devices include signal emitters.

18. The system of claim 17 wherein the signal devices include light emitters.

19. The system of claim 17 wherein the signal devices include radar emitters.

20. The system of claim 16 wherein the signal devices include signal receivers.

21. The system of claim 20 wherein the signal devices include solar cells.

22. The system of claim 16 wherein the at least one flexible support member includes a first flexible support member and a second flexible support member, and wherein at least one of the fasteners is connected between the first flexible support member and the second flexible support member.

23. The system of claim 22 wherein the at least one fastener is adhesively attached to the exterior surface of the blimp and includes first and second projections, and wherein the first flexible support member includes a first aperture in which the first projection is received, and the second flexible support member includes a second aperture in which the second projection is received.

24. The system of claim 23 wherein the first projection includes a shaft and a head, the head having an opening, and wherein the system further comprises a strap connected to the first flexible support member and passing through the opening in the head.

25. The system of claim 16 wherein the fasteners are the only elements connecting the flexible support members to the blimp exterior surface.

26. The system of claim 16 wherein the at least one flexible support member is stretched between and releasably attached to a first fastener and a second fastener.

27. A method for installing a signal array on a blimp, comprising:
 attaching first and second fasteners to an outwardly facing curved surface of a blimp;
 releasably attaching a first flexible support member having a first elongated base to the first fastener and releasably attaching a second flexible support member having a second elongated base to the second fastener;
 supporting a plurality of signal device carriers with the first and second flexible support members, wherein the signal device carriers extend between the first and second flexible support members in a direction generally normal to the first and second elongated bases of the flexible support members, and wherein individual signal device carriers have multiple, spaced apart signal devices; and
 electrically connecting signal devices carried by the plurality of signal device carriers in a signal array.

28. The method of claim 27 wherein electrically connecting signal devices includes electrically connecting light-emitting devices in a video display array.

29. The method of claim 27, further comprising attaching a third fastener to the curved surface of the blimp and stretching the first flexible support member between the first fastener and the third fastener.

30. The method of claim 27, further comprising releasably attaching a third support member to the first fastener.

31. The method of claim 27 wherein attaching the first and second fasteners includes adhesively attaching the first and second fasteners.

32. The method of claim 27 wherein the curved surface includes a decal, and wherein attaching the first and second fasteners includes attaching the first and second fasteners to the decal.

33. The method of claim 27, further comprising:
 removing the first flexible support member from the first fastener without removing the first fastener from the blimp; and
 replacing the first flexible support member with a third flexible support member.

34. The method of claim 27 wherein releasably attaching the first flexible support member to the first fastener includes:
 passing a head of the first fastener through a mounting hole of the first flexible support member so that a through hole in the head is exposed;
 passing a strap through the through hole; and
 attaching the strap to the first flexible support member.

* * * * *